United States Patent [19]

Ross et al.

[11] 4,296,726

[45] Oct. 27, 1981

[54] COLLAPSIBLE CHARCOAL LIGHTING HOLDER

[76] Inventors: Jim Ross, P.O. Box 5204; John Vilicich, 836 S. Gaffey St., both of San Pedro, Calif. 90731

[21] Appl. No.: 97,518

[22] Filed: Nov. 26, 1979

[51] Int. Cl.³ .............................................. A47J 37/00

[52] U.S. Cl. .................................... 126/25 B; 220/19

[58] Field of Search ......................... 126/25 B; 220/19

[56] References Cited

U.S. PATENT DOCUMENTS

| | | | |
|---|---|---|---|
| 2,333,954 | 11/1943 | Rocker et al. | 220/19 |
| 2,812,098 | 11/1957 | Escuat | 220/19 |
| 3,979,856 | 9/1976 | Belcher | 220/19 |
| 4,102,317 | 7/1978 | Shonnard et al. | 126/25 B |

*Primary Examiner*—Samuel Scott
*Assistant Examiner*—Wesley S. Ratliff, Jr.
*Attorney, Agent, or Firm*—Joseph Shulsinger

[57] ABSTRACT

An operably collapsible device for suspending quantities of charcoal briquets in an inverted conical shape to facilitate rapid, even ignition.

6 Claims, 4 Drawing Figures

COLLAPSIBLE CHARCOAL LIGHTING HOLDER

BACKGROUND OF THE INVENTION

1. Field of the Invention

This invention relates to portable devices for facilitating the rapid ignition of charcoal and more particularly to collapsible devices for use with home barbecues.

2. Description of the Prior Art

Although charcoal briquets and chunks of charcoal are widely used in home barbecues and the like, there are certain disadvantages traditionally attendant to their use. It is difficult to obtain even ignition of all the briquets and it usually takes a long time to achieve an even burning set of coals. Many attempts have been made to overcome these disadvantages with varying amounts of success.

Liquid inflammable fluids have been developed for pouring on the briquets. These fluids are messy, potentially dangerous, usually possess an unpleasant odor and are becoming relatively expensive.

Electric heating elements are inefficient and unwieldy and require a handy source of electrical power.

Chimney type holders have been developed. These are usually cylindrical in shape and are placed vertically on the fire bed. The charcoal is stacked inside the cylinder and ignited. Air is drawn in through apertures at or near the botton. The lower pieces of charcoal are ignited and by convection the rising hot gases cause the upper pieces of charcoal to ignite. These devices, although useful, still possess disadvantages. The oxygen in the incoming air is rapidly depleted leaving insufficient oxygen to support efficient combustion of the upper pieces of charcoal. The cylinder walls are usually formed from sheet metal which conducts the heat away from the adjacent pieces of charcoal. Due to the vertical stacking, the radiant heating from the ignited lower pieces of charcoal is only utilized in a vertical direction, wasting a lot of the heat. Once the charcoal is ignited, the holder must be removed. It is usually very hot and requires tools to handle. It must be placed where it will not burn anything, including inquisitive children.

Devices such as U.S. Pat. No. 2,939,773 granted to Russel S. Rymer June 7, 1960 partially solve the problem of feeding oxygen to the upper pieces of charcoal by providing holes in the vertical cylinder walls, but the rest of the above-mentioned problems remain.

Devices such as U.S. Pat. No. 3,957,455 granted to Roger S. Clark May 18, 1976 solve the problem of the transmission through the cylinder walls by forming the cylinder from material with low thermal conductivity. However, the oxygen starvation problem remains.

The present invention solves all the above-mentioned problems as well as being capable of storage in a small volume, and is inexpensive to fabricate.

SUMMARY

The present invention may be visualized as a collapsible, inverted, cone-shaped, wire basket suspended from the top by foldable supports. The charcoal is poured into the basket from the top and the lower pieces of charcoal ignited. The hot gases from the burning lower pieces of charcoal rise by convection causing the upper pieces to ignite. Fresh air is drawn in on all sides allowing the higher pieces of charcoal to burn efficiently. This raises the temperature of combustion thus hastening the even ignition of all the pieces of charcoal. Also, due to the inverted pyramid shape of the mass of charcoal pieces, the upper pieces of charcoal intercept a large proportion of the heat radiated from the lower pieces of charcoal, thus hastening the ignition.

The collapsible basket is actually a series of rings, or other open plane geometric shapes, of graduated sizes such that, if the largest ring is suspended in a horizontal plane, the remaining rings are suspended below it, each in a horizontal plane, in order of decreasing size. The collapsible members may be slidable links or sections of chains. Alternatively the collapsible basket may comprise the aforementioned open plane geometric shapes collapsibly interconnected by rods or bars. The rods or bars may pass through apertures in the open geometric shapes. Keepers may be suitably placed along each rod or bar such that the movement of each ring or other open geometric shape with respect to the bar is restricted and none of the open geometric shapes is allowed to slide off either end of a rod or bar. Foldably attached to the largest of the series of interconnected rings are support members or legs which, when erected, suspend the entire basket composed of the series of rings and the collapsible members such that the inverted cone shape is formed. These support members or legs are so connected to the largest ring that the base of the support members may be pulled outward causing the entire invention to collapse into a horizontal plane with the support members extending radially outward from the rings.

In use, the invention is erected in the fire pit of the barbecue and the inverted cone-shaped basket is filled with charcoal. The lower pieces of charcoal are ignited through any conventional means. Through both convection and radiation the upper pieces of charcoal are heated to the ignition point and efficient combustion is supported by fresh air drawn in from underneath and through all sides. As soon as the upper pieces of charcoal are ignited, the support members are pulled out from under the rings and the entire invention collapses into a flat position at the bottom of the fire pit. The coals are then spread around the fire pit without removing the charcoal holder. Thus, there is no messy, hot charcoal holder to create a fire hazard or endanger children. Of course, the charcoal holder may be readily removed at this point if it is desired, but it is not necessary to do so. After the fire is out, the support members may be folded over the collapsed rings to form a compact package for storage, or the entire invention may be left in the fire pit ready for use.

DETAILED DESCRIPTION

The present invention is composed of a series of successively larger, nesting, similar, plane geometric shapes, slidably interconnected to form a truncated inverted cone or pyramid when suspended by the outermost, largest shape of the series, and support members foldably connected to said outermost largest shape.

Figure 1:
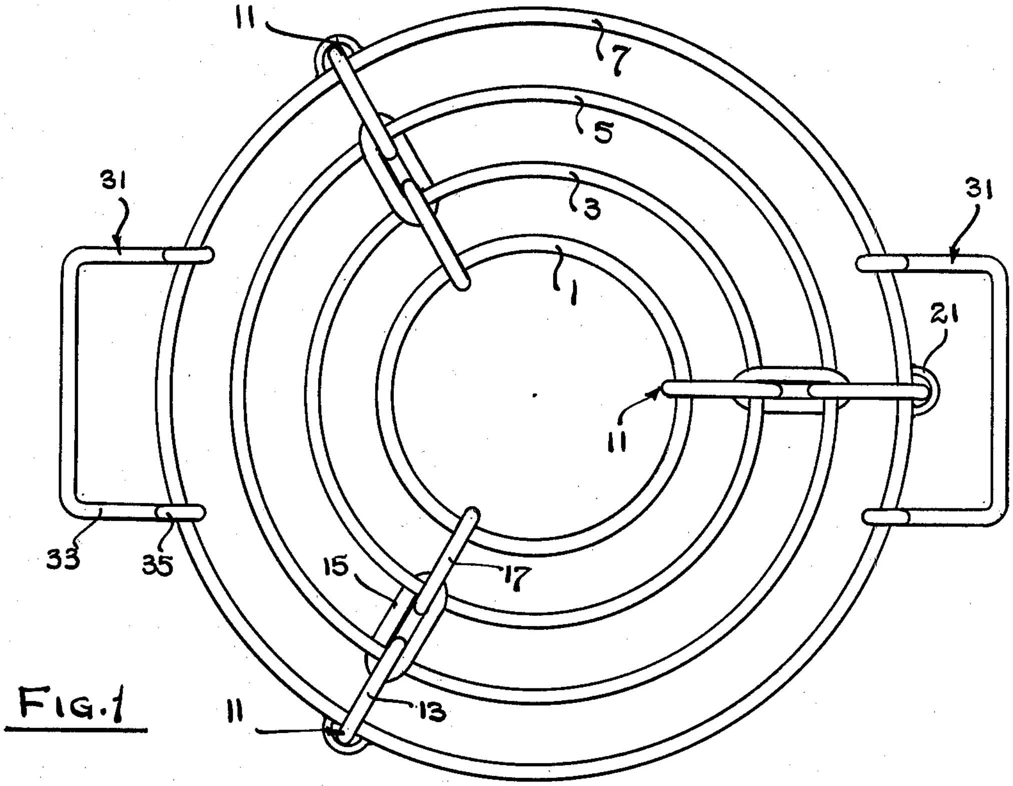
FIG. 1 depicts in plan view the invention in the erected position.

The preferred embodiment, depicted in perspective in FIG. 1, utilizes concentric circular rings 1,3,5,7, which may be formed from butt-welded heavy gauge wire, as the plane geometric shapes. Other shapes such as squares or rectangles may be employed, but the operation is most efficient employing circular rings. Similarly any noncombustible material may be used for the rings, which may be fabricated by any available means.

The circular rings may be slidably interconnected by at least three series of links 11. In the preferred embodiment, each series of links is comprised of elongated links 13,15,17 similar to chain links. The number of links in each series is one less than the number of concentric circular rings. The successive links in each series are intertwined. The outermost, largest-diameter, concentric ring 7 passes through the opening in the first link 13 of each series. The next smaller concentric ring 5 passes through the openings of both the first 13 and second 15 links of each series. The next smaller concentric ring 3 passes through the openings in both the second 15 and third 17 links of each series. The procedure is continued for successively smaller concentric rings and successive links until the innermost or smallest concentric ring 1 only passes through the opening of the last link 17 of each series of links.

Alternatively, the series of links 11 may comprise a number of smaller links successively intertwined as a chain. In such an embodiment a number of links may intervene between successive concentric rings.

The series of links should be spaced equidistant around the rings and a retainer 21 may be affixed to the outermost ring 7 near each series of links in a manner to maintain the circumferential spacing between the series of links.

Two or more support members 31 may be foldably connected to the outermost, largest ring 7. The height of each support member 31 should be chosen such that, when all the support members are in the erected position, the series of rings will be suspended, utilizing the series of links, thus forming a truncated, inverted cone or pyramid with the innermost, smallest-diameter ring 1 suspended slightly above the surface upon which the support members are resting.

In the preferred embodiment two support members 31 are employed, each formed by bending a length of heavy gauge wire in the form of a U. The legs 33 of the U are bent, near the base of the U, at right angles, in the same direction, and perpendicular to the plane of the U. The distal ends of the legs 35 are formed loosely around the outermost, largest diameter ring 7.

Figure 2:
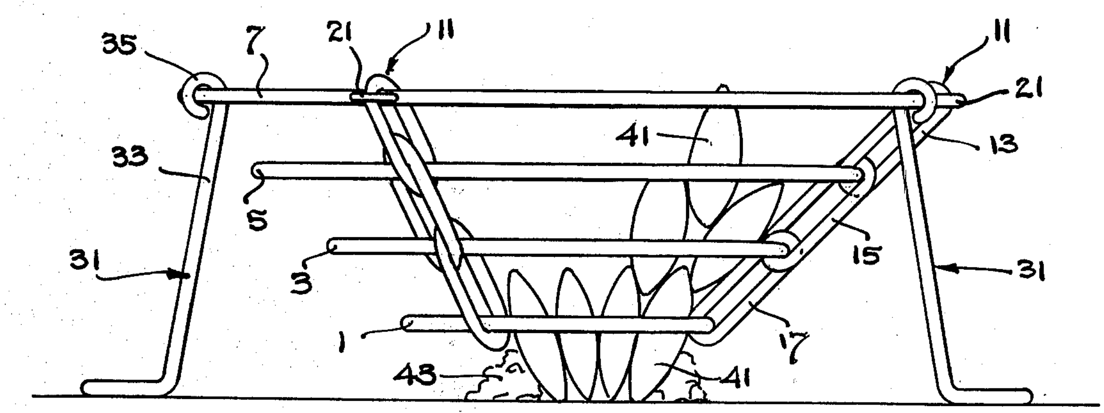
FIG. 2 depicts in elevation the invention erected and containing charcoal briquets.

In operation, the support members 31 are positioned in the erected position. This maintains the outermost ring 7 horizontal in its highest position and the remaining rings are suspended therefrom as depicted in FIG. 2. The charcoal briquets 41 or chunks are poured into the inverted cone formed thereby. inflammable material 43 such as crumpled newspaper or kindling, may be placed under the pile of charcoal 41 or the lower briquets may be dampened with an inflammable fluid. The inflammable material 43 or fluid may be ingited. The lower briquets will be ignited from the heat of the burning inflammable material 43 or Inflammable fluid. The heat of the burning lower briquets will be spread to the upper briquets by convection and radiation, rapidly causing ignition of all the briquets. Oxygen to support the combustion will be drawn in at all levels all around the circumference of the cone by convection.

Figure 3:
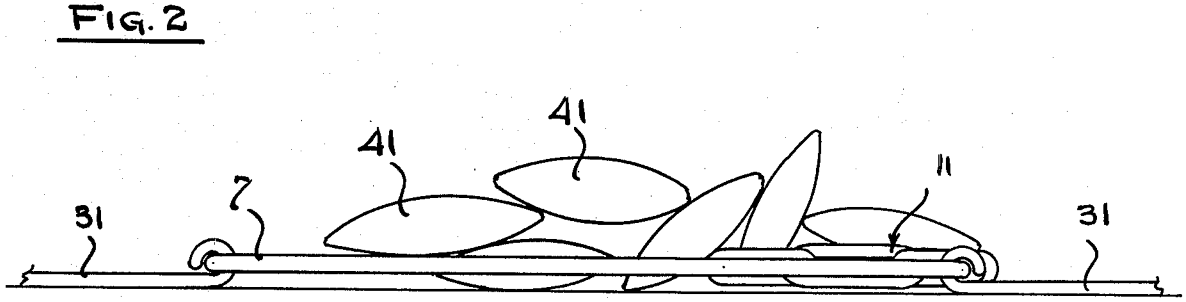
FIG. 3 depicts in elevation the invention collapsed with the support members extended radially outward.

When the charcoal is sufficiently hot, the bases of the support members 31 may be pulled out from under the outermost ring 7, causing the entire charcoal lighter to collapse as depicted in FIG. 3. The burning individual briquets may then be spread to form an even bed of coals. If desired, the charcoal holder may be removed, but it is not necessary to do so.

Figure 4:
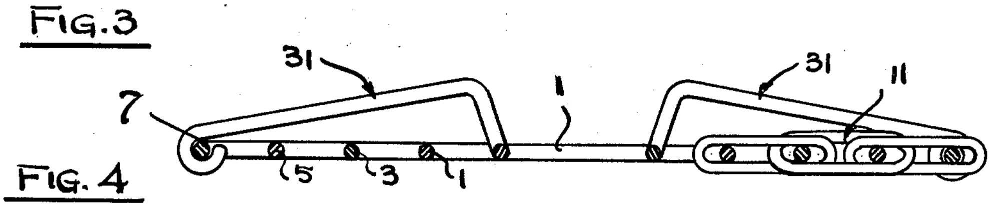
FIG. 4 depicts in elevation the invention folded for compact storage.

When the charcoal lighter is not in use, the support members 31 may be folded over the nested concentric rings for compact storage as depicted in FIG. 4.

We claim:

1. An operably collapsible device for holding charcoal in a manner to facilitate ignition, comprising
- a series of successively larger, nesting, similar, plane geometric shapes
- at least three slidable interconnecting means spaced equidistant around the circumference of said plane geometric shapes such that,
  - when the largest of said plane geometric shapes is suspended horizontally, the series of shapes depend therefrom, spaced apart approximately equally, to form an inverted truncated cone or pyramid, and
  - when said plane geometric shapes are allowed to rest on a horizontal surface said plane geometric shapes nest together in one horizontal plane
- at least two support members foldably connected to the largest of said plane geometric shapes such that
  - as a first alternative, said support members may be positioned fully erect causing the largest said plane geometric shape be suspended approximately horizontally, with the remaining plane geometric shapes depending therefrom to form an inverted truncated cone or pyramid, the lowest portion of which is suspended slightly above the plane of the lower extremities of said support members, and
  - as a second alternative, said support members may be positioned extending radially out from the largest of said plane geometric shapes, and
  - as a third alternative, said support members may be positioned folded over said plane geometric shapes.

2. The device of claim 1 wherein said series of successively larger, nesting, similar, plane geometric shapes comprises circles of different diameters.

3. The device of claim 2 wherein said circles of different diameters are formed from heavy gauge wire.

4. The device of claim 1 wherein said at least three slidable interconnecting means comprises at least three lengths of chain, each said length of chain comprising a series of interconnected links with the number of links in each said length of chain being not less than the number of said plane geometric shapes minus one.

5. The device of claim 4 wherein the largest said plane geometric shape passes through one link at a first end of each said length of chain, the smallest said plane geometric shape passes through one link at a second end of each said length of chain, and all other said plane geometric shapes pass through at least one intermediate link of each said length of chain.

6. The device of claim 1 wherein said at least two support members comprise at least two U shaped members, formed such that the ends of the legs of each said U shaped member distal the base thereof are movably connected to the largest of said plane geometric shapes.

* * * * *